United States Patent [19]

Hunter

[11] Patent Number: 4,734,847
[45] Date of Patent: Mar. 29, 1988

[54] MICROSTEPPING MOTOR CONTROLLER CIRCUIT

[76] Inventor: L. Wayne Hunter, 15075 NW. Pioneer Rd., Beaverton, Oreg. 97006

[21] Appl. No.: 809,492

[22] Filed: Dec. 16, 1985

[51] Int. Cl.$^4$ .................... G05B 19/40; H02P 8/00
[52] U.S. Cl. .................... 364/174; 318/685; 318/696; 364/400
[58] Field of Search .................... 364/167–171, 364/174, 400, 130, 701–703, 768, 770, 784–787; 318/685, 696, 601, 603

[56] References Cited

U.S. PATENT DOCUMENTS

| | | | |
|---|---|---|---|
| 3,893,616 | 7/1975 | Trousdale | 364/174 X |
| 4,262,336 | 4/1981 | Pritchard | 364/174 X |
| 4,377,847 | 3/1983 | Daniel et al. | 364/400 |
| 4,446,412 | 5/1984 | Friedman et al. | 318/685 X |
| 4,489,259 | 12/1984 | White et al. | 318/696 |
| 4,535,405 | 8/1985 | Hill et al. | 364/400 |
| 4,584,512 | 4/1986 | Pritchard | 318/685 X |

OTHER PUBLICATIONS

Nordquist, Jack I., et al., "A Motion Control System for (Linear) Stepper Motors," Xynetics Products Div. of General Signal, Santa Clara, Calif.—17 pages.

"Motion Control and Pulse Sources," Compumotor Corporation, Petaluma, Calif., Applications Note 2—8 pages.

Primary Examiner—Joseph Ruggiero
Attorney, Agent, or Firm—Klarquist, Sparkman, Campbell, Leigh & Whinston

[57] ABSTRACT

A controller circuit for controlling the movement of a stepper motor or the like about one or more axes is disclosed. The circuit includes a microprocessor and associated circuitry for generating velocity and distance control signals according to a preferred method. According to the method, a constant acceleration number provided by the user is cumulatively added to itself to produce a velocity number. In addition, the velocity number is cumulatively added to itself to produce a pulse rate number. The pulse rate number is routed as a plural bit number to a counter wherein it is used to generate a train of stepper motor control pulses. The preferred method and circuitry allow the microprocessor to generate the stepper motor control pulses at a very high rate of speed without requiring peripheral adder circuitry.

5 Claims, 10 Drawing Figures

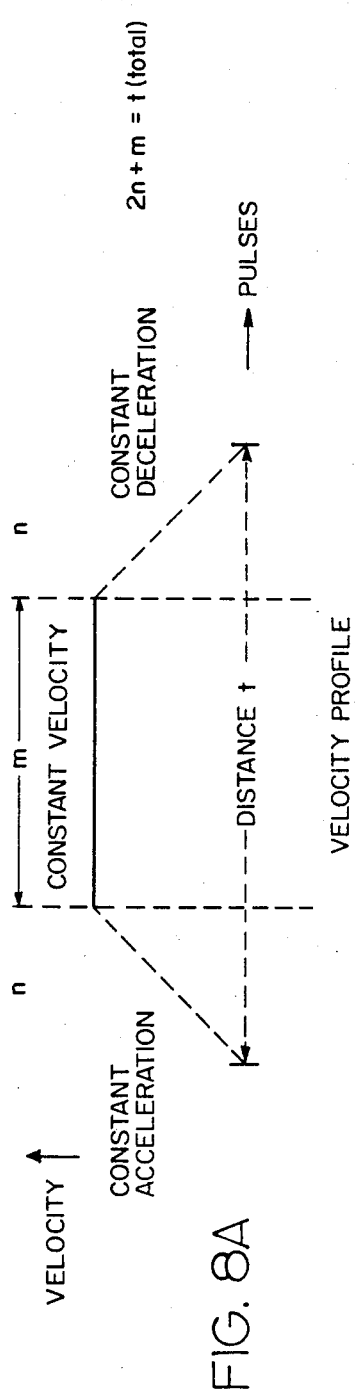
FIG. 8A
FIG. 8B
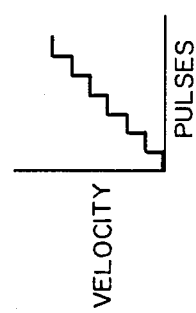
FIG. 9

MICROSTEPPING MOTOR CONTROLLER CIRCUIT

This invention relates to a controller circuit for controlling stepper motors and the like. More particularly, the present invention relates to a stepper motor controller circuit that continually calculates a velocity profile at a rapid rate to provide smooth and accurate movement of a motor driven by the circuit in response to the velocity profile.

BACKGROUND OF THE INVENTION

Stepper motors which precisely control motion are important components of electronic equipment like computer peripherals and industrial robots. In these devices, a stepper motor is driven by a driver which in turn is controlled by a controller circuit. Controller circuits available today can charge two adjacent windings of a stepper motor to different magnetic levels. This causes the motor's rotor to stop at various positions between the motor's stator magnets. This process, called "microstepping," permits movement of the motor in much smaller increments than the steps between magnets, typically breaking each motor step into as many as 100 microsteps.

The stepper motor controller circuits in the prior art rely on advanced microprocessors and other electronic components to generate control signals for driving the stepper motors at high speeds with accurate control. The technique commonly employed by these circuits, however, requires extensive peripheral circuitry in order to generate the control signals quickly enough for very high speed motor movement. This technique and its limitations are illustrated by a controller circuit manufactured by Compumotor Corporation of Petaluma, Calif., and by the approach discussed in "A Motor-Control System For (linear) Stepper Motors," by Nordquist et al, of Xynetics Products, Santa Clara, Calif.

In this technique, an acceleration bit number is received from the user and stored in a look-up table by the circuit. The acceleration bit number is used to periodically update a velocity bit number. The amount of change in the value of the velocity bit number depends upon the size of the stores acceleration bit number. In addition, in the compumotor device the velocity bit number forms an input to an adder which is connected to an input of an edge triggered latch. The latch has its output connected to an input of the adder. This circuit adds the value in the adder to the velocity number and deposits the total back in the adder. The latch is clocked by the system clock. When the adder overflows, a carry signal is generated which becomes the control signal or drive pulse that is routed to the stepper motor to drive the motor. The Nordquist article discloses another circuit which generates such carry signals. The rate of generation of the drive pulses depends upon the value of the velocity bit number. The higher the velocity bit number, the more frequent the generation of carry signals or drive pulses and the faster the motor covers distance (measured in pulses to the stepper motor).

One major drawback to this approach is the need for peripheral adder circuitry. In these devices, very high speed movement, such as 500,000 drive pulses/sec, requires a 500 kHz clock, because these devices generate only a single carry signal in each clock cycle. The internal circuitry of current microprocessors cannot perform the add and signal feedback at this high rate. Therefore, to accomplish this very high speed control, these prior art circuits use peripheral adders, with the number of such adders depending on the desired velocity resolution. These adders and associated circuitry add significantly to both the cost and size of the overall controller circuit.

Therefore, a need exists for an improved stepper motor control circuit which is directed toward overcoming these and other problems of prior art devices.

SUMMARY OF THE INVENTION

An object of the invention is to provide an improved controller circuit for precisely controlling the movement of a stepper motor or the like.

Another object of the invention is to reduce the cost and size of such a controller circuit with respect to the prior art.

A third object of the invention is to provide such a controller circuit on a plug-in card so that a host central processing unit (CPU) can control the stepper motor through the controller circuit.

Still another object of the invention is to utilize internal microprocessor circuitry to generate the drive pulses to the stepper motor.

A still further object of the invention is to provide such a controller circuit employing a novel method of generating a velocity profile for stepper motor control.

These and other features, advantages, and objects of the present invention will be apparent from the following detailed description of a preferred embodiment and drawings.

BRIEF DESCRIPTION OF THE DRAWINGS

FIG. 8A is an exemplary velocity profile produced by the FIG. 1 controller circuit.

FIG. 8B is a second velocity profile produced by the FIG. 1 controller circuit.

FIG. 9 is a magnified view of a portion of FIGS. 8A, 8B showing the step increase in velocity during constant acceleration.

DETAILED DESCRIPTION

Functional Overview

The invention comprises a multiple axis motor controller circuit for controlling the movement of rotary and linear stepper motors and servomotors. The circuit can control motor velocity, acceleration, position, and direction by outputting step and direction signals, the step signals being electrical pulses of varying frequency. In its operation, the circuit utilizes microstepping techniques for increased position resolution and decreased low speed resonance. When combined with the appropriate driver and stepper motor, the circuit can divide the normal step angle into 250 discrete steps of 0.0072° each or 50,000 steps per revolution. The circuit connects to a host central processing unit (CPU) from which it receives motion and direction command signals and data. In response to these commands, the circuit calculates an optimum velocity profile, examples shown in FIGS. 8A, 8B, used to generate the desired movement while conforming to the acceleration and velocity data input from the host CPU.

Figure 1:
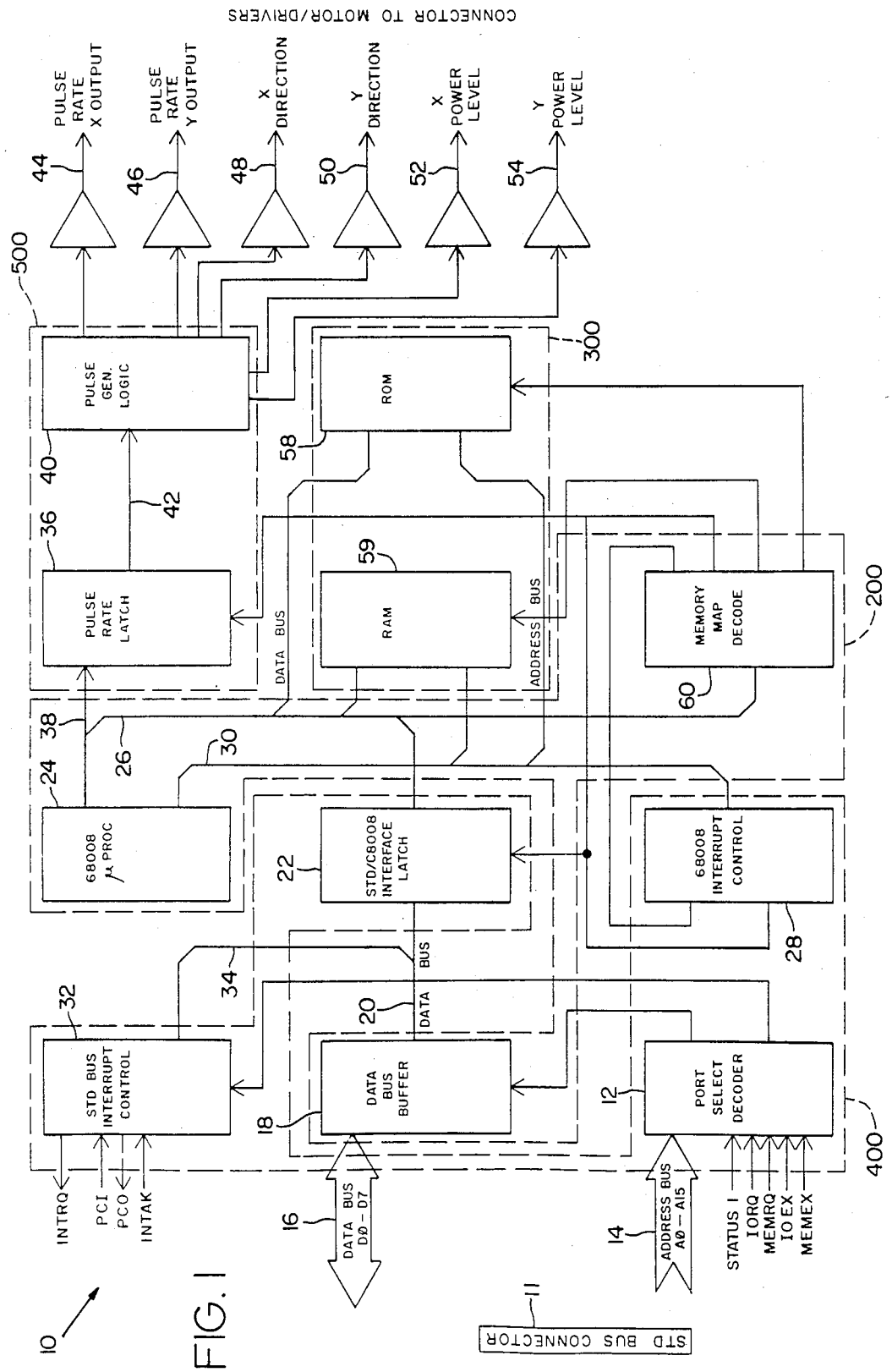
FIG. 1 is a functional block diagram of a controller circuit according to one embodiment of the invention.

Referring to FIG. 1, a functional block diagram of one embodiment of a controller circuit 10 in accordance with the invention is shown. In this embodiment, the circuit 10 is designed to be STD bus compatible and is described with reference to specific components. It should be understood, however, that this embodiment is for illustration only and that the invention is not so limited. Commands from a host CPU (not shown) are transmitted with appropriate address information to the controller circuit through a bus 11. The address is decoded by port selector 12 connected to the bus 11 via an address bus 14. The data on bus 11 is routed through a data bus 16 to a bidirectional data bus buffer 18 which passes the data, via an internal data bus 20, to an interface latch 22. The latch 22 transmits the data to a microprocessor 24 over a signal path 26. Signals are also passed to the host CPU from the microprocessor 24 through the latch 22 and data bus buffer 18. This movement of data to and from the controller circuit is directed by a conventional interrupt scheme, represented by interrupt control blocks 28, 32 connected to data bus 20 along path 34.

From the command data it receives, the microprocessor 24 calculates a pulse rate number that is transmitted to a pulse rate latch 36 along a path 38. Latch 36 is coupled to pulse generating logic 40 along a path 42 and is clocked by logic 40. Pulse generation logic 40 generates output pulses to stepper motor drivers (not shown) in response to the pulse rate number. The approach utilized by this circuitry, as explained below, eliminates peripheral adders and other associated components needed in prior art devices to achieve very high speed stepper motor control. These pulses are directed through buffers to form X output 44 for one axis and Y output 46 for the Y axis. The frequency of the pulses determines the acceleration and velocity of motor movement. The number of pulses determines the distance of movement. The pulse generation logic 40 also generates direction signals 48, 50 for the X, Y axes, respectively. The logic state (high or low) of the direction signals indicates the direction of movement along the axis. Power level signals at respective X power level and Y power level outputs 52, 54 are also produced to provide high current for torque while a motor is working and low current while the motor is idle.

Microprocessor 24 is programmed as explained below to receive the data from bus 11 and produce the signals for controlling the movement of the stepper motor. The software routines are stored in PROM 58. Temporary storage registers, queues for the X and Y directions, and other signals necessary for operation are stored in RAM 59. The microprocessor communicates with PROM 58 and RAM 59 through a conventional memory map decode circuit indicated by block 60.

The components of the controller circuit are discussed in the next section of this description, with references to the corresponding blocks above shown in parenthesis. The overall operation of the software within the controller circuit and the method employed by the microprocessor to generate a velocity profile are then explained in the final section.

Controller Circuit Components

In this embodiment of the invention, the hardware components are commercially available, with the specific designations of each component being listed in Table I. Several of the components are programmable array logic (PALS) which are understood with reference to their equations listed in Table II.

Figure 2:
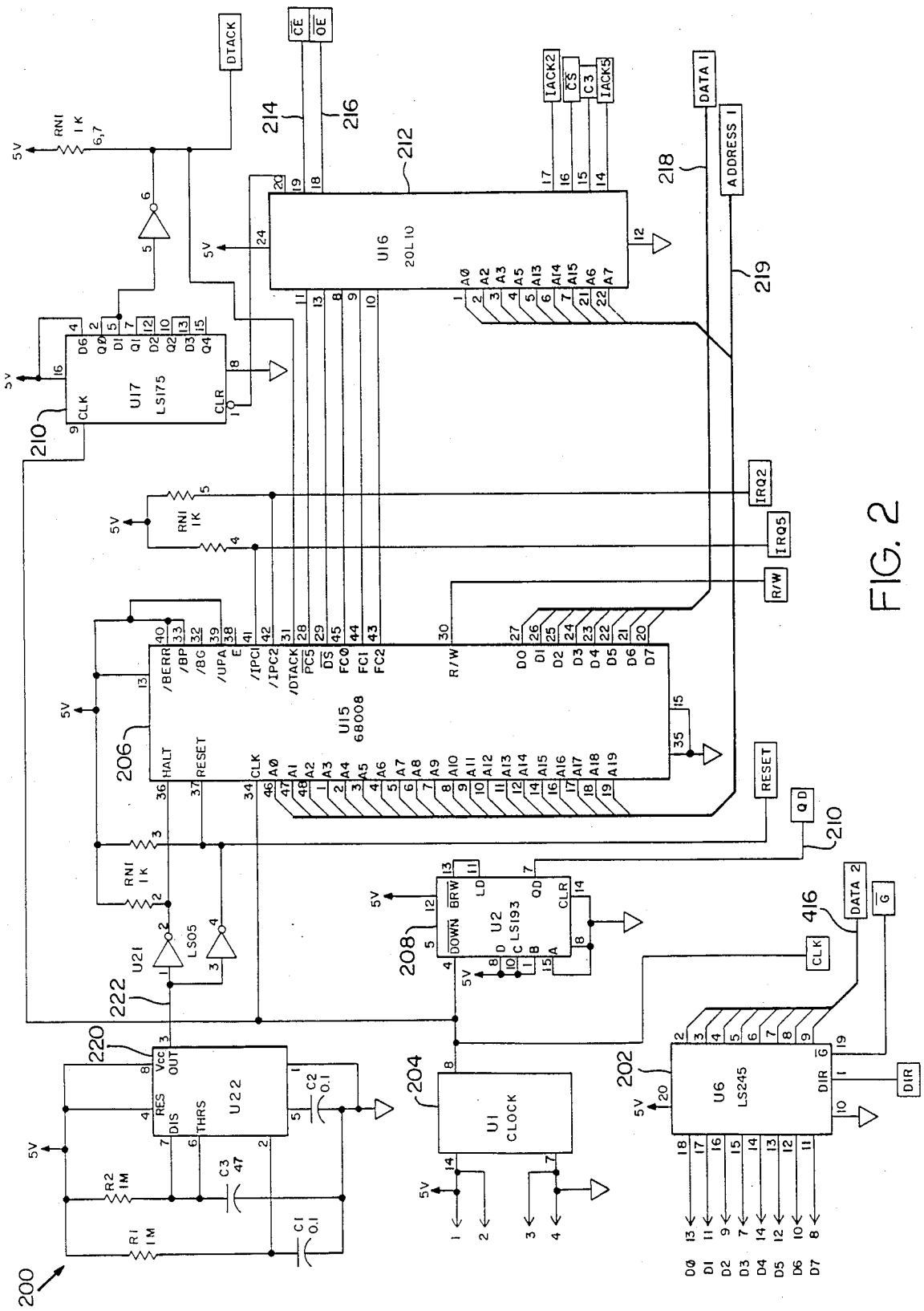
FIG. 2 is a schematic diagram of the data bus buffer, microprocessor, and memory interface portions of the FIG. 1 controller circuit.

Referring to the circuit portion 200 of FIG. 2, data from the host CPU is sent to the controller circuit through bidirectional bus transceiver 202 (block 18). The direction and the destination of the data are controlled by components shown in FIG. 4, as discussed hereinafter, for receiving data from the host CPU or for communication with the CPU by the controller circuit 10.

FIG. 2 also includes the circuit clock 204. This clock generates an appropriate 7 MHz signal for clocking a microprocessor 206 (block 24) and for providing a signal to an up/down counter 208, which divides the 7 MHz signal by fourteen and transmits that signal along a line 210 to components of FIG. 5. In addition, the clock signal is routed to a D flip-flop 210 that produces a data transfer acknowledge signal for microprocessor 206 (block 24) in accordance with the operation of the microprocessors as well as for other components shown in FIGS. 4 and 5.

Data is transferred to and from memory by a PAL 212 (block 60) which performs memory interfacing for the microprocessor 206. PAL 212 enables RAM 304 (block 59) and PROM 302 (block 58) of circuit portion 300 of (FIG. 3) over lines 214 and 216, respectively. With the memory enabled and the data transferred from microprocessor 206 (block 24) along data path 218 to the memory, PAL 212 (block 60) generates an acknowledgment signal to D flip-flop 210 which in turn produces the data transfer acknowledge signal to the microprocessor 206.

In the upper left of FIG. 2, a timer 220 is shown whose output path 222 is coupled to the halt and reset inputs of microprocessor 206. Timer 220 is configured to provide a one shot signal to the microprocessor 206 to halt processing while controller circuit 10 is powered up.

Figure 3:
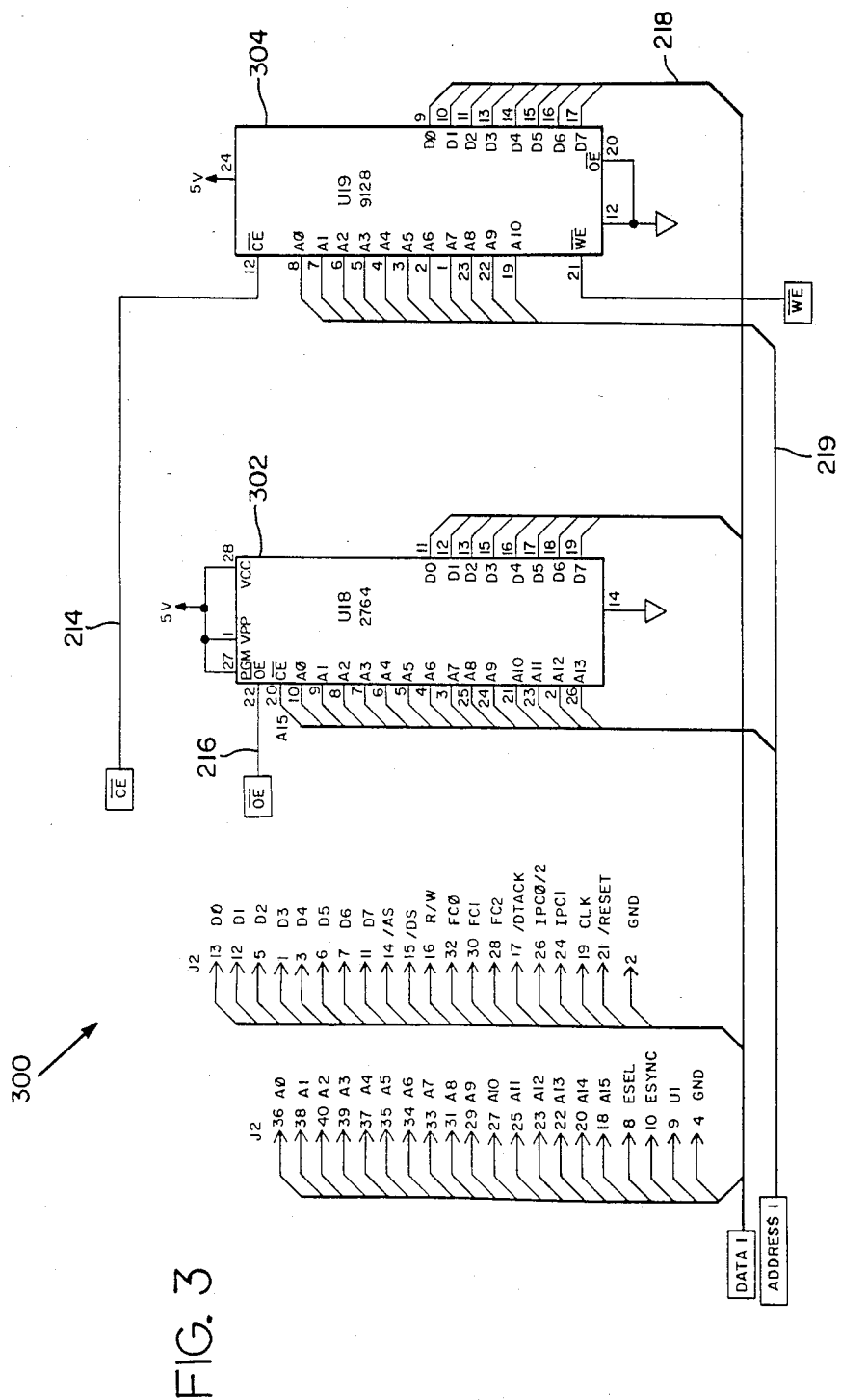
FIG. 3 is a schematic diagram of the memory portion of the FIG. 1 controller circuit.

FIG. 3 of the drawings shows PROM 302 (block 58) and RAM 304 (block 59) connected to data path 218 and an address path 219. The memory 302, 304 is accessed according to the conventional scheme. Firmware within PROM 302 provides the control and profiling routines required to generate the velocity profile. This firmware is set forth in the pseudo code of Table III. RAM 304 stores information from the host CPU.

Figure 4:
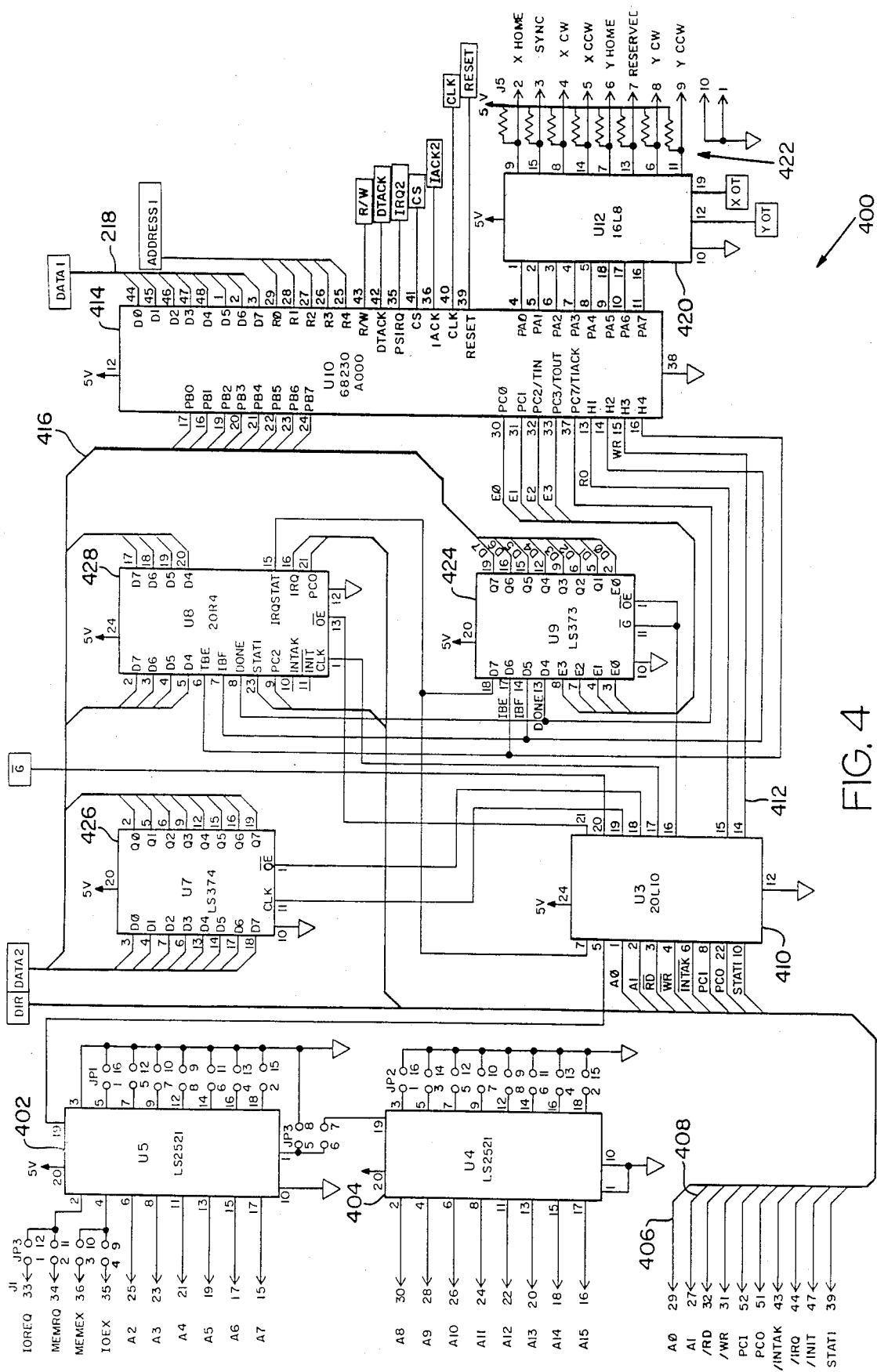
FIG. 4 is a schematic diagram of the interrupt control and host microprocessor interface portions of the FIG. 1 controller circuit.

The actual addresses of the controller circuit 10 are determined by the configurations of comparators 402 (block 12) and 404 (block 12) within the circuit portion 400 of FIG. 4. Addressing can be either 8-bit addressing or 16-bit addressing, depending upon the selection of jumpers by the user at the right side of each comparator in FIG. 4. The addressing lines to the comparators 403, 404, however, do not contain the two lower bits of the address, which instead are received over lines 406 and 408 from the bus 10 along with other information signals. These two lower order bits are routed to a PAL 410 (block 12) along with the address bits from comparators 402, 404. PAL 410 then decodes the address and generates a read signal along path 412 to a peripheral interface 414 to read the data present on the outputs of bidirectional bus transceiver 202 (block 18) shown in FIG. 2. The data is transmitted from transceiver 202 to a peripheral interface 414 (block 22, 28) along data path 416. Peripheral interface 414 receives the data at port B and transmits it to microcompressor 206 along data path 218.

The peripheral interface 414 is also connected at port A to a PAL 420 which senses the location of the stepper motor relative to predetermined limitation on movement. If the motor reaches a limitation, such as full extension of an attached arm, limitation signals are generated on PAL 420 lines 422 and transmitted to the peripheral interface 414 for transmission to the microprocessor 206, which is programmed to change the movement of the motor in response to such signals.

FIG. 4 contains several registers that are used for interrupt control with the host CPU. Latch 424 (block 32) is a status register that provides status information to the host CPU. PAL 428 (block 32) is a control register that allows different interrupt sources from the circuit 10 to be individually enabled or disabled. Flip flop 426 (block 32) is an interrupt vector register.

Figure 5:
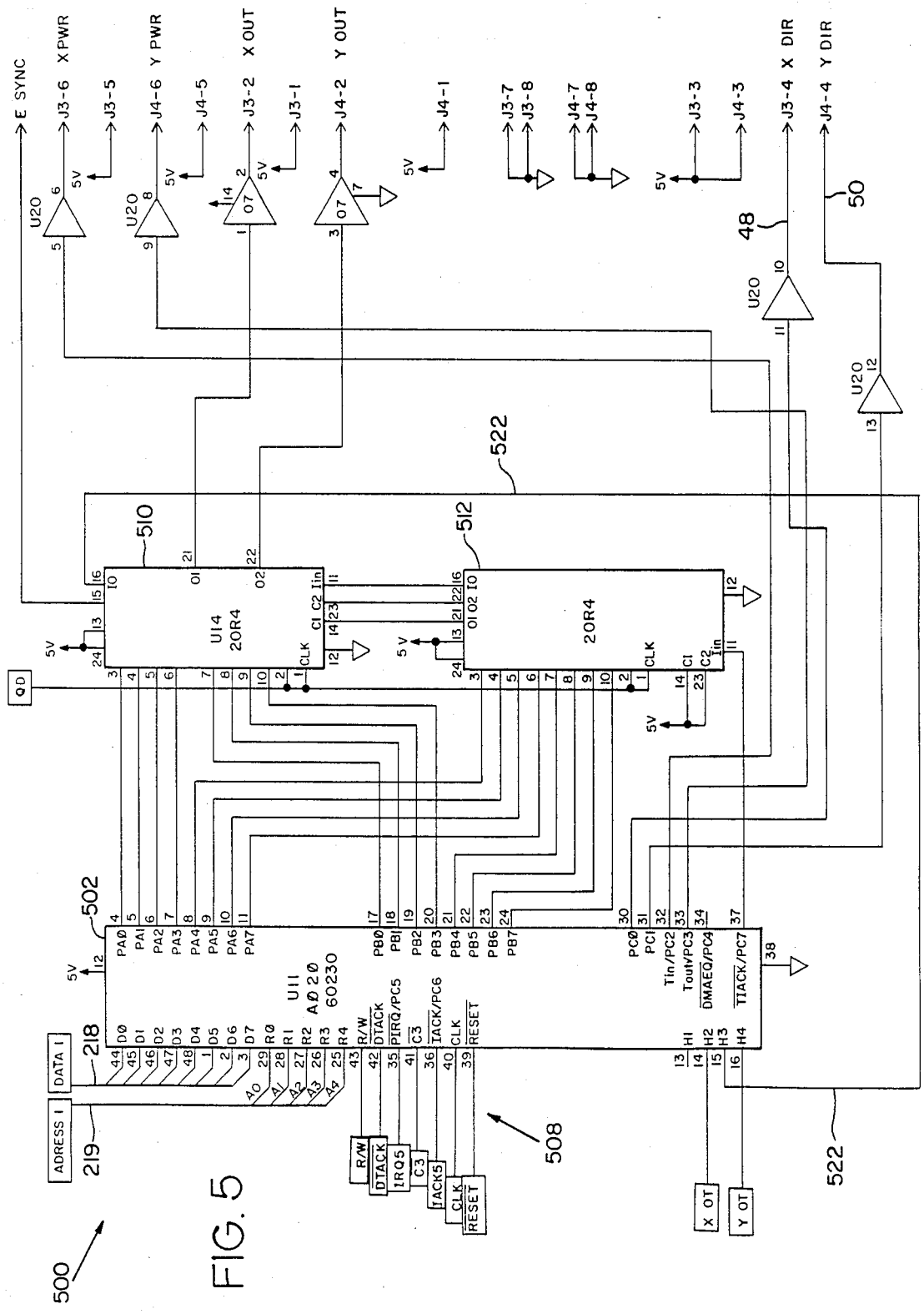
FIG. 5 is a schematic diagram of the pulse rate latch and pulse generation logic portions of the FIG. 1 controller circuit.
Figure 6:
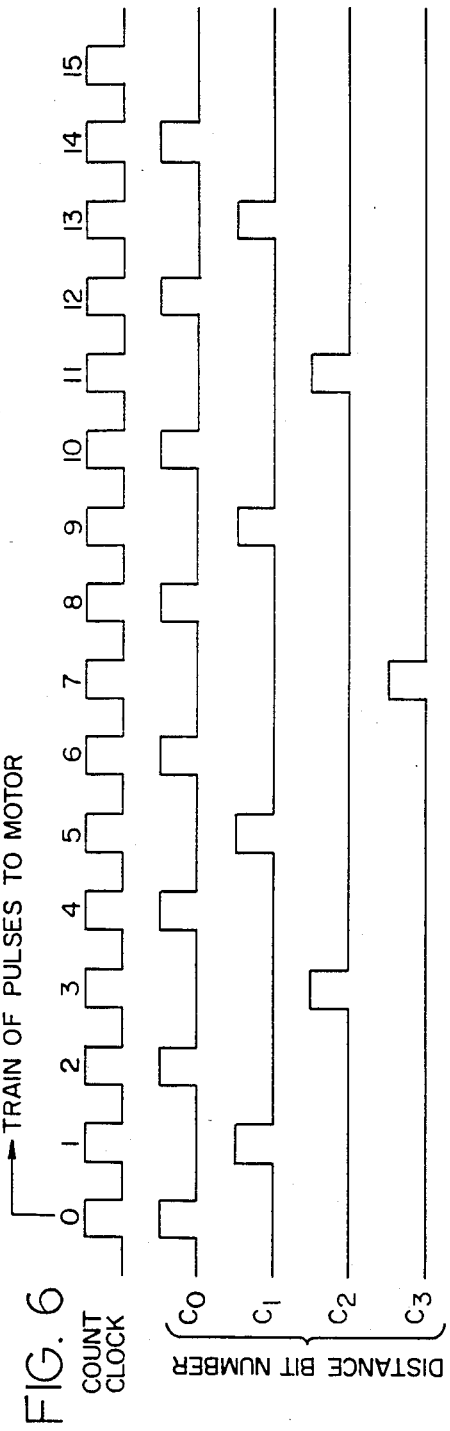
FIG. 6 is a timing diagram illustrating the method employed by the FIG. 1 controller circuit to generate the pulses to the driver of the stepper motor.

Circuit portion 500 in FIG. 5 shows a peripheral interface 502 (block 36) and PALs 510, 512 (block 40). Peripheral interface 502 receives a pulse rate number generated by the microprocessor 206 (block 24), as explained below, in response to data received from the host CPU. This pulse rate number is received along a data path 218 (path 38 in FIG. 1) with an appropriate address along path 219. When activated by the microprocessor 206 along control lines 508, data is transmitted to the logic in PALs 510 and 512, which form a rate multiplier. PAL 510 receives the lower 4-bits of each pulse rate number generated by microprocessor 206 for each axis X, Y. PAL 512 receives the upper 4-bits of each pulse rate number. Within each PAL, a stream of pulses is generated by combining the output of an internal counter with the pulse rate number provided by the microprocessor 206 according to the PAL equations to generate a pulse train for the X and Y axes along output lines 44, 46. One such output (for four of the 8 bits only) is shown in FIG. 6, with the pulse rate number equal to 15.

Peripheral interface 502 also provides a signal to the stepper motor to indicate which direction for the motor to move along each axis. These signals are transmitted from output 48 for the X direction and from output 50 for the Y direction.

This pulse rate number is updated continually by microprocessor 206 according to the method discussed below and is routed to the peripheral interface 502. The number is sent from the peripheral interface 502 on the generation of an interrupt signal by PAL 510, which occurs each time the counter reaches its terminal count 256. This interrupt is generated at approximately a 2 kHz rate and is sent to the peripheral interface 502 along line 522.

Method of Pulse Generation

Figure 7:
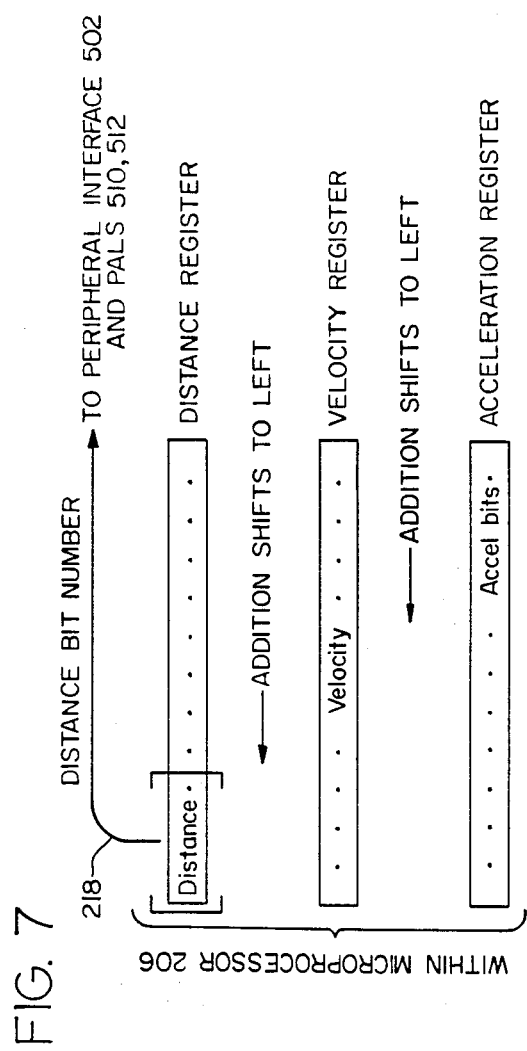
FIG. 7 is a block diagram illustrating the generation of velocity and pulse rate numbers according to an algorithm utilized by the FIG. 1 controller circuit.

The pseudo code for the software operation of controller circuit 10 is given in Table III. The procedures set forth therein generate the bit numbers for creating a pulse train to drive the stepper motor. Referring now to FIG. 7, an acceleration value (in pulses/sec$^2$) is received from the host CPU and stored within an acceleration register within RAM 304 (block 59) of circuit 10. The host data may also include a desired maximum velocity (in pulses/sec), and includes a total distance (in pulses) to be moved. To generate velocity from acceleration, the number in the acceleration register is routed to the adder of microprocessor 206 and cumulatively added to itself once every terminal count from PAL 510. PALs 510, 512 are clocked by signal QD on line 210 from counter 208 (FIG. 2), which is generating a 500 kHz signal. The cascaded counter within PALs 510, 512 is counting to 256, so that its terminal count is generated at approximately a 2 kHz rate. This rate is well within the capability of microprocessor 206 to route the number from the acceleration register to the adder and cumulatively add the acceleration to itself. The velocity number that is generated in this manner is then cumulatively added to itself in a separate addition operation to produce the pulse rate number. Both these addition operations occur within the between interrupts from PAL 510 time of approximately one-half millisecond, and these additions occur within a 32-bit adder of microprocessor 206.

More specifically, the fundamental relationships during ramp up and ramp down are expressed as follows:

$$a = K$$

$$v = KT + V(\phi)$$

$$S = KT^2/2 + V(\phi)T = VT/2 + V(\phi)T + S(\phi)$$

wherein a is acceleration, which is a constant K; v is velocity, T is time, V $\phi$ is initial velocity, s is distance, and S($\phi$) is the initial distance from a reference. Typically S($\phi$) is set equal to zero. The distances of interest is the distance to be moved from the previous motor position.

These equations are implemented in the microprocessor as set forth in the pseudo code. By arranging a sample rate N to be an even binary number, the divide is a bit shift and the multiplication is distributed over all of the sample intervals. The results can be added to another accumulator to keep track of the total distance traveled.

That is, the multiplication process is performed by adding K to a velocty accumulator at a periodic sampling interval. The result is then:

$$v = NKT$$

where N is the number of samples per second and assuming V ($\phi$) is zero.

The multiplication is thus reduced to an addition during each sample interval. This allows the microprocessor to perform the multiplication in real time during the profile generation. This also minimizes any delay required for the controller to calculate move parameters prior to starting the move.

This process is repeated using the above velocity output as an input to another accumulator to produce the following result:

$$s = N^2 K T^2$$

which is in the same form as the above fundamental relationship except it has been shifted to the left by 2 log N+1 (base 2) bits. The difference between s (after dividing by $N^2$) at any given time interval and s at the prior interval is the number of pulses which should be delivered to the motor during the given interval. This will consist of an integer part and a fractional part. The integer part (the top 8 bits of the adder) is output to the rate multiplier at each sample interval while the fractional part is retained in the accumulator to prevent round off errors.

This algorithm allows the controller to generate pulse rates 500 kHz or higher (i.e. 1 MHz) while the microprocessor only performs addition operations at a rate of 2048 times per second. A conventional 68008 microprocessor thus has time to handle two such addition processes as well as the other control tasks.

As an alternate approach to the pulse train generation approach, the distance accumulator (second accumulator in above description) if the integer part is also retained, generates a ramp of phase. This can be converted to a sine or triangle wave by a table lookup or logic conversion process which produces the necessary analog signal to drive one stepper motor coil. The second coil can be generated by phase shifting the first by 90 degrees. The microprocessor in this way synthesizes the sine waveforms required and thus also performs the function of the traditional translator module. This results in further savings in part count and thus significantly reduces system cost.

The upper 8 bits of the microprocessor adder output form the pulse rate number which is routed to PALs 510, 512 along path 218 and then cleared from the top 8 bits. This is, the pulse rate number is fed to PALs 510, 512 which produce a train of pulses, the frequency of which depends on the value of the pulse rate number. Referring to FIG. 8A and the PAL equations of Table II for PALs 510, 512, each of the bits of the pulse rate number is evaluated against the counter within the PALs 510, 512 to see which of the counter's pulses will be an output to the stepper motor. For example, if the pulse rate number were all ones, all 256 counter pulses would be output from the PAL 510 on line 522 to effectively produce a velocity of 500 kHz. For plural axis control, pulse rate numbers for both X and Y axis motion are generated and processed in the same manner.

The optimum velocity profile shown in FIG. 8 is generated by updating the pulse rate number approximately every half millisecond and comparing the value of the velocity against the maximum velocity input. The microprocessor 206 checks the instantaneous, calculated velocity against the maximum velocity. When the maximum velocity is reached, the microprocessor determines how many pulses, designated n, of the total pulses in the distance number, designated t, have been used to reach the maximum velocity. The processor then subtracts n from the remaining pulses (the remaining pulses being the quantity t−n) to produce the number of pulses, designated m, of constant velocity. This leaves n pulses of the total in which to decelerate the stepper motor to zero at the conclusion of the total of t pulses.

The microprocessor 206 also uses this approach to generate automatically a triangular velocity profile shown in FIG. 8B if insufficient pulses exist for reaching the desired maximum velocity level. To accomplish this, the microprocessor 206 constantly checks the value n against the total pulses t and, if 2n=t, the microprocessor begins to decelerate the stepper motor.

TABLE I

| Component | Designation |
| --- | --- |
| Data bus buffer 202 | 74LS245 |
| Clock 204 | 7.340032 MHz clock, Fox F1100 |
| Microprocessor 206 | Motorola MC 68008 |
| Counter 208 | 74LS193 |
| D flip-flop 210 | 74LS175 |
| PAL 212 | 20L10 |
| Timer 220 | 555 |
| PROM 302 | 27128-25 |
| RAM 304 | AM9128-10PC |
| Comparators 402, 404 | 25LS2521 |
| PAL 410 | 20L10 |
| Peripheral interface 418 | Motorola MC 68230 |
| PAL 420 | 16L8 |
| Latch 424 | 74LS373 |
| D flip-flop 426 | 74LS374 |
| PAL 428 | 20R4 |
| Peripheral interface | Motorola MC 68230 |
| PAL 520 | 20R4 |
| PAL 522 | 20R4 |

TABLE II

```
PAL20L10                                                PAL DESIGN SPECIFICATION
LOC.PAL 212
68008 local bus chip selects etc
a0 a2 a3 a5 a13 a14 a15 fc0 fc1 fc2 /as gnd
/ds /iack5 /cs230__1 /cs230__0 /iack2 /romcs /ramcs ackx a6 a7 /extio vcc
if (vcc) iack2 = as * a0 * a2 * /a3 * fc0 * fc1 * fc2
if (vcc) iack5 = as * a0 * a3 * fc0 * fc1 * fc2
if (vcc) romcs = as * /a14 * /a15
if (vcc) ramcs = as * ds * /a13 * a14 * /a15
if (vcc) cs230__0 = as * ds * /a5 * /a6 * /a7 * a13 * a14 * /a15
if (vcc) cs230__1 = as * ds * a5 * /a6 * /a7 * a13 * a14 * /a15
if (vcc) extio = as * ds * a6 * a7 * a13 * a14 * /a15
if (vcc) /ackx = /as
              + /a6 * /a7 * a13 * a14 * /a15
              + a0 * fc0 * fc1 * fc2
FUNCTION TABLE
/as /ds a0 a2 a3 a5 a6 a7 a13 a14 a15 fc0 fc1 fc2
/iack2 /iack5 / romcs /ramcs /cs230__0 /cs230__1 /extio ackx
                                                                    /         /
;                                                                   c         c
;                                                       /   /   /   /   s     s    /
;                                                       i   i   r   r   2     2    e
;                                                       a   a   o   a   3     3    x    a
;                                   a   a   a   f   f   f   c   c   m   m   0     0    t    c
; a   d   a   a   a   a   a   a     1   1   1   c   c   c   k   k   c   c               i    k
; s   s   0   2   3   5   6   7     3   4   5   0   1   2   2   5   s   s   0     1    o    x    COMMENTS
  H   H   X   X   X   X   X   X     X   X   X   X   X   X   H   H   H   H   H     H    H    L    nothing selected
```

TABLE II-continued

| | | | | | | | | | | | | | | | | | | | | |
|---|---|---|---|---|---|---|---|---|---|---|---|---|---|---|---|---|---|---|---|---|
| L | L | H | H | L | X | X | X | X | X | H | H | H | H | L | H | H | H | H | L | iack2 |
| L | L | H | L | H | X | X | X | X | X | H | H | H | H | L | H | H | H | H | L | iack5 |
| L | L | X | X | X | X | X | X | L | L | X | X | L | H | H | L | H | H | H | H | romcs |
| L | L | X | X | X | X | X | L | H | L | X | X | L | H | H | H | L | H | H | H | ramcs |
| L | L | X | X | L | L | L | H | H | L | X | X | L | H | H | H | H | L | H | L | cs230_0 |
| L | L | X | X | X | H | L | L | H | L | X | X | L | H | H | H | H | L | H | L | cs230_1 |
| L | L | X | X | X | X | H | H | H | L | X | X | L | H | H | H | H | H | L | H | external io |

DESCRIPTION
Chip selects and interrupt acknowlege generation

---

PAL20L10                                                          PAL DESIGN SPECIFICATION
STD88.PAL 410
    STD BUS Interface logic (8088 Protocol)
A0 A1 /RDL /WRL /BS /INTAK IRQSTAT PCI /MCSYNC /STAT1 /STAT0 GND
NC /DATAWR /DATARD /STAT /CNTRLWR /IACK /VECTWR /TE /CNTRLRD PCO BDIR VCC
IF (VCC) DATARD = BS * /A0 * A1 * RDL
IF (VCC) DATAWR = BS * /A0 * /A1 * WRL
IF (VCC) IACK = INTAK * IRQSTAT * PCI
             + BS * A0 * /A1 * RDL
IF (VCC) VECTWR = BS * A0 * /A1 * WRL
IF (VCC) CNTRLRD = BS * /A0 * A1 * RDL
IF (VCC) CNTRLWR = BS * /A0 * A1 * WRL
IF (VCC) STAT = BS * A0 * A1 * RDL
IF (VCC) /BDIR = /RDL * /INTAK
IF (VCC) TE = BS * RDL
        + BS * WRL
        + INTAK * IRQSTAT * PCI
IF (VCC) /PCO = /PCI
        + IRQSTAT
DESCRIPTION
Chip selects for STD interface
  addr
  offset
    0    data
    1    vector
    2    control register
    3    status register

---

PAL20R4                                                           PAL DESIGN SPECIFICATION
INT.PAL 428
    STD INTERRUPT HANDLER LOGIC
CLK IRQ_E TBE_E IBF_E DONE_E TBE IBF DONE PCI /INTAK /INIT GND
/OE NC IRQSTAT IRQ LIRQ_E LTBE_E LIBF_E LDONE_E DACK IRQST /STAT1 VCC
/LIRQ_E := /IRQ_E
/LTBE_E := /TBE_E
/LIBF_E := /IBF_E
/LDONE_E := /DONE_E
IF (VCC) /IRQST = LIRQ_E * /STAT1 * LTBE_E * TBE
                + LIRQ_E * /STAT1 * LIBF_E * IBF
                + LIRQ_E * /STAT1 * LDONE_E * DONE * DACK
                + /IRQST * STAT1 * /INIT
IF (VCC) /DACK = DONE * INTAK * LDONE_E
                + /DACK * DONE * /INIT
IF (VCC) /IRQSTAT = IRQST
IF (/IRQST) /IRQ =
FUNCTION TABLE
CLK /OE IRQ_E TBE_E IBF_E DONE_E TBE IBF DONE /INTAK /INIT /STAT1
LIRQ_E LTBE_E LIBF_E LDONE_E IRQST IRQSTAT /DACK
```
;                                                              I
;                           /  /  L  L  D        R
;          I  T  I  O       I  /  S  I  T     I  O     /
;          R  B  B  N    D  N  I  T  R  B  N  R  S  /  D
; C   /    Q  E  F  E  T  I  O  T  N  A  Q  E  F  E  Q  T  I  A
; L   O    _  _  _  _  B  B  N  A  I  T     _  _  _  S  A  R  C
; K   E    E  E  E  E  E  F  E  K  T  1  E  E  E  E  T  T  Q  K   COMMENTS
```

| | | | | | | | | | | | | | | | | | | | |
|---|---|---|---|---|---|---|---|---|---|---|---|---|---|---|---|---|---|---|---|
| H | H | L | L | L | L | X | X | X | X | X | L | L | L | L | L | L | Z | H | initial state |
| C | L | L | L | L | L | X | X | X | X | X | L | L | L | L | L | L | Z | H | |
| C | L | H | H | H | H | L | L | H | H | H | H | H | H | L | L | Z | H | | |
| L | L | X | X | X | X | H | L | L | H | H | H | H | H | H | H | L | H | tbe interrupt |
| L | L | X | X | X | X | L | H | L | H | H | H | H | H | H | H | L | H | ibf interrupt |
| L | L | X | X | X | X | L | L | H | H | H | H | H | H | H | H | L | H | done interrupt |
| L | L | X | X | X | X | L | L | H | L | H | H | H | H | H | H | L | H | hold interrupt thru stat1 |
| L | L | X | X | X | X | L | L | H | L | L | H | H | H | H | H | L | L | set done acknowledged |
| C | L | X | X | X | L | L | H | H | H | H | H | H | L | H | H | L | L | hold dack till not done |

DESCRIPTION
Interrupt handling pal

---

PAL16L8                                                           PAL DESIGN SPECIFICATION
sync.pal 420
    External synchronization control
xccwdir yccwdir nc nc busy /ycw /yhome /xcw /xhome gnd
/yccw yot nc /xccw /sync yhome_s xhome_s wait xot vcc

TABLE II-continued

```
if (busy) sync =
if (vcc) /wait = /sync
if (vcc) /xot = /xcw * /xccw
            + xcw * xccwdir
            + xccw * /xccwdir
if (vcc) /yot = /ycw * /yccw
            + ycw * yccwdir
            + yccw * /yccwdir
if (vcc) /xhome_s = /xhome
if (vcc) /yhome_s = /yhome
```

DESCRIPTION

---

PAL20R4                                                                                          PAL DESIGN SPECIFICATION
rate, PAL 510, 512
  rate generator logic
clock clk i0 i1 i2 i3 j0 j1 j2 j3 inhin gnd
/oe /casci /sync inhout q3 q2 q1 q0 /outi /outj /cascj vcc

```
/q0 := q0 * /inhin
     + /q0 * inhin
/q1 := /q1 * /q0 * /inhin
     + q1 * q0 * /inhin
     + /q1 * inhin
/q2 := /q2 * /q0 * /inhin
     + /q2 * /q1 * /inhin
     + /q2 * /q1 * q0 * /inhin
     + /q2 * inhin
/q3 := /q3 * /q0 * /inhin
     + /q3 * /q1 * /inhin
     + /q3 * /q2 * /inhin
     + q3 * q2 * q1 * q0 * /inhin
     + /q3 * inhin
if (vcc) outi = /clk * i3 * /q0 * /inhin
             + /clk * i2 * /q1 * q0 * /inhin
             + /clk * i1 * /q2 * q1 * q0 * /inhin
             + /clk * i0 * /q3 * q2 * q1 * q0 * /inhin
             + casci
if (vcc) outj = /clk * j3 * /q0 * /inhin
             + /clk * j2 * /q1 * q0 * /inhin
             + /clk * j1 * /q2 * q1 * q0 * /inhin
             + /clk * j0 * /q3 * q2 * q1 * q0 * /inhin
             + cascj
if (vcc) /inhout = q0 * q1 * q2 * q3 * /inhin * /clk
if (vcc) sync = q0 * q1 * q2 * q3 * /inhin * /clk
```

FUNCTION TABLE
clock clk i0 i1 i2 i3 j0 j1 j2 j3 /casci /cascj inhin /sync
q0 q1 q2 q3 inhout /outi /outj

```
;                 inputs                              outputs
;
;                                    /   /                 i
;   c                                c   c    i           n   /    /    /
;   l                                a   a    n           h   o    o    s
;   o   c                            s   s    h           o   u    u    y
;   c   l   i   i   i   i   j   j   j   j   c   c    i   q   q   q   q   u   t    t    n
;   k   k   0   1   2   3   0   1   2   3   k   j    n   0   1   2   3   t   i    j    c    COMMENTS
    L   H   L   L   L   L   L   L   L   L   H   H    L   L   L   L   H   H   H    H
    C   H   L   L   L   L   L   L   L   L   H   H    H   L   L   L   L   H   H    H    H
    C   L   L   L   H   L   L   L   H   L   H   H    L   H   L   L   L   H   L    L    H
    C   L   L   L   L   H   L   L   L   H   H   H    L   L   H   L   L   H   L    L    H
    C   L   L   H   L   L   L   H   L   L   H   H    L   L   L   H   L   H   L    L    H
    C   L   L   L   L   L   L   L   L   L   H   H    L   L   L   L   H   L   H    H    H
    C   L   L   L   L   L   L   L   L   L   H   H    L   L   H   L   H   H    H    H
    C   L   H   L   L   L   H   L   L   L   H   H    L   H   H   H   L   H   L    L    H
    C   L   L   L   L   L   L   L   L   L   H   H    L   L   L   L   H   H   H    H    H
    C   L   L   L   L   L   L   L   L   L   H   H    L   L   H   L   H   H   H    H    H
    C   L   L   L   L   L   L   L   L   L   H   H    L   H   L   H   H   H   H    H    H
    C   L   L   L   L   L   L   L   L   L   H   H    L   L   L   H   H   H   H    H    H
    C   L   L   L   L   L   L   L   L   L   H   H    L   H   L   H   H   H   H    H    H
    C   L   L   L   L   L   L   L   L   L   H   H    L   L   H   H   H   H   H    H    H
    C   L   L   L   L   L   L   L   L   L   H   H    L   H   H   H   H   H   H    H    H
    C   L   L   L   L   L   L   L   L   L   L   L    L   L   L   L   L   H   L    L    H
```

DESCRIPTION
Four bit two channel binary rate multiplier with ability to cascade.

---

TABLE III
Firmware Pseudo-Code

Procedure main
  initialize communication parameters
  initialize circular instruction queues
  set default acceleration and velocity parameters
  do forever
    get_cmnd        (get command and execute)

TABLE III-continued
Firmware Pseudo-Code

```
Procedure get_long
        if sign = "-"
                flag result as negative
        while character = 0 to 9
                convert number to internal binary format
Procedure get-ulong        (unsigned number)
        while character = 0 to 9
                convert number to internal binary format
Procedure get_cmnd
        case command:
"AC"    put2que(putac, value)      (set acceleration value)
"EN"    turn on echo mode
"EF"    turn off echo mode
"FP"    flush instruction queue    (force position)
        empty loop stack
        put2que(forcepos,          (attempts to stop at specified
        value)                      position)
        putque(stopat)
        putque(endwait)            (Make sure nobody waiting)
"GO"    putque(start)              (start motion)
        putque(accel)              (ramp up)
        putque(flat)               (flat top)
        putque(decel)              (ramp down)
"GD"    putque(start)              (slightly different algorythm)
        putque(accel)
        putque(flat)
        putque(stopat)
"HM"    put2que(home, value)       (wait for remote switch and
                                    set position counter to
                                    parameter)
        putque(stop)               (decelerate to stop)
"JG"    put2que(putvl, value)      (set velocity)
        putque(slew)               while no new command
"KL"    execute scratch            (flush instruction queues)
        empty loop stack
        execute kill               (stop pulse generation
                                    immediately)
        execute endwait            (don't wait for anybody)
"LP"    putque(ldpos, value)       (load position counter)
"LS"    put2que(lp_start, value)   (initialize start of loop)
"LE"    put2que(loop_end)          (decrement loop counter
                                    and loop)
"MA"    put2que(putma, value)      (initialize move absolute)
"MR"    put2que(putmr, value)      (initialize move relative)
"PH"    putque(pwrhi)              (set power level to high)
"PL"    putque(pwrlo)              (set power level to low)
"RS"    putque(reset)              (software processor reset)
"SA"    execute scratch            (flush both queues)
        putque(stop)               (stop both axis)
        putque(endwait)            (no body waits)
"ST"    execute scratch            (flush one queue)
        putque(stop)               (stop this axis)
        putque(endwait)            (don't wait)
"SS"    putque(set_sync)           (set hardware sync flag)
"SC"    putque(clr_sync)           (clear hardware sync flag)
"SW"    putque(wait_sync)          (wait for sync flag clear)
"VL"    putque(get_ulong)          (get velocity parameter)
        put2que(putvl, value)      (set peak velocity parameter)
"WA"    putque(setw)               (set wait flag)
        putque(wait)               (and wait for other axis)
"WE"    putque(endwait)            (end wait sequence)
"WY"    resond with identity
"X"     switch to x axis commands
"Y"     switch to y axis commands
"ID"    putque(setdone)            (interrupt host when done)
"IC"    execute clrdone            (clear done flag)
Procedure putque
        wait for room in queue
        put address of routine to execute in instruction queue
Procedure put2que
        wait for room in queue
        put address of routine and parameter in queue
Procedure start
        set velocity to zero
        set intermediate distance accumulator to zero
        set ramp down distance to zero
        get acceleration parameter
        send velocity of zero to hardware to satisfy interrupt
Procedure stjog
        get velocity parameter
        update velocity to satisfy interrupt
Procedure synth        (main pulse gen interrupt entry point)
        if previous level = 5 exit        (phoney interrupt)
        save machine state
        get pointer to x control block
        if limit switch activated
                flush instruction queue
                clear velocity parameter  (i.e. stop now!)
                set overtravel error flag
        else if instruction in que
                get address of routine to execute
                do it
        else
                output velocity to satisfy interrupts
        repeat for Y axis
Procedure stop
        get incremental distance parameter
        strip upper byte which was output last time
        add velocity to it
        save incremental distance
        get upper byte
        output to port        (distance traveled since last interrupt)
        update position register
        subtract acceleration from velocity to get updated velocity
        if positive
                save velocity
Procedure slew        (jog)
        if velocity not = max velocity
                if velocity greater than max velocity
                        decelerate
                else
                        accelerate
        output distance to travel this interrupt
        update position counter
Procedure home
        if home switch not closed
                if velocity less than max velocity
                        accelerate
                output distance to travel
        else
                set position counter to parameter
                decelerate to stop keeping track to position traveled
Procedure accel
        add acceleration to velocity to update velocity
        keep track of distance to ramp up (rddist)
        output distance to travel
        update position register
        if velocity equal or greater than max velocity
                go to next command on next interrupt
        if distance to travel equal rddist
                skip flat and decelerate on next interrupt
Procedure flat
        get distance to travel this interrupt
        output to rate generator
        update position register
        if distance to travel equal rddist
                decelerate on next interrupt
Procedure decel
        get distance to travel this interrupt
        output to rate generator
        update position register
        subtract acceleration from velocity to update velocity
        if greater than zero
                save updated velocity
        if move complete
                execute next command on next interrupt
Procedure stopat        (attempt to stop at specified location)
                        (to allow changing destination on fly)
                        (may not be able to stop at location)
        get distance to travel this interrupt
        output to rate generator
        update position register
        if distance to travel less than rddist
                subtract acceleration from velocity
                save updated velocity
        if velocity = zero
                execute next command on next interrupt
Procedure set_sync
        assert hardware event line
        output to rate generator to satisfy interrupt
Procedure clr_sync
```

TABLE III-continued
Firmware Pseudo-Code

```
        deassert hardware event line
        output to rate generator to satisfy interrupt
Procedure wait_sync
        check state of sync line
        output to rate generator
        if sync line cleared
                execute next command on next interrupt
Procedure kill
        set velocity to zero
        output to rate generator
        execute next command on next interrupt
Procedure cw
        flag direction as clockwise
Procedure ccw
        flag direction as counter clockwise
Procedure loop_end
        output to rate generator
        decrement loop counter
        if zero
                execute next command on next interrupt
        else
                jump back to beginning of loop
Procedure lp_start
        save loop count for loop_end
        output to rate generator
        next command
Procedure forcepos
        save new position in destination register
        output to rate generator
        next command
Procedure putma
        compute new destination
        set direction
        output to rate generator
        next command
Procedure putmr
        compute new destination
        set direction
        output to rate generator
        next command
Procedure putvl
        set new peak velocity
        output to rate generator
        next command
Procedure putac
        set new acceleration
        output to rate generator
        next command
Procedure scratch          (executed immediately)
        flush queue to eliminate any instructions
        reset loop counter
        clear wait flag
Procedure setdone
        be sure done flag cleared
        set it
        output to rate generator
        next command on next interrupt
Procedure clrdone          (executed immediately)
        clear done flag
Procedure reset
        hardware reset peripheral chips
        load stack pointer
        jump to beginning of program
Procedure wrterr
        write error flag to status
        flag error with interrupt
Procedure endwait
        clear wait flags
        write to rate generator
        next instruction on next interrupt
Procedure setw
        set wait flag
        clear wait flag for other axis
        write to rate generator
        next instruction on next interrupt
Procedure swait
        if not wait flag
                synchronize waits
        write to rate generator
```

TABLE III-continued
Firmware Pseudo-Code

```
        next instruction on next interrupt
```

Having illustrated and described the principles of the invention in a preferred embodiment, it should be apparent to those skilled in the art that the invention can be modified in arrangement and detail without departing from such principles.

I claim all modifications coming within the spirit and scope of the following claims:

1. A method of generating a train of signal pulses for controlling movement of a stepper motor about at least one axis, comprising:
   providing an acceleration value;
   providing a maximum velocity and total distance value;
   calculating a velocity value by adding the acceleration value cumulatively to itself at a predetermined rate, each addition producing a velocity value;
   calculating a distance value by adding the velocity value cumulatively to itself at a predetermined rate, each addition producing a distance value;
   comparing, after each velocity calculation, the velocity value against the maximum value;
   terminating the acceleration addition once the maximum velocity value is reached;
   calculating the number of pulses n required to reach the maximum velocity;
   subtracting the number of pulses n from the remaining pulses to produce a number of pulses m for constant velocity;
   generating a constant velocity for m pulses;
   decelerating for n pulses, the $2n+m$ pulses equaling the total distance value; and
   generating a train of signal pulses in response to the distance value and repeating the above steps at the predetermined rate.

2. A controller circuit for generating a train of signal pulses to control the movement of a stepper motor about at least one axis, comprising:
   means for storing an acceleration value, a maximum velocity value, and a total distance value;
   means for adding the acceleration value to itself cumulatively to produce a velocity value;
   means for adding a velocity value to itself to produce a distance value;
   means for comparing, after each velocity calculation, the velocity against the maximum value;
   means for terminating the accelerating addition once the maximum velocity value is reached;
   means for calculating the number of pulses n required to reach the maximum velocity;
   means for subtracting the number of pulses n from the remaining pulses to produce a number of pulses m for constant velocity;
   means for generating a constant velocity for m pulses;
   means for decelerating for n pulses, the $2n+m$ pulses equaling the total distance value; and
   means for producing in response to the distance value a train of signal pulses for controlling the movement of the motor.

3. The circuit of claim 2 in which the means for adding the acceleration value and the velocity value is the internal circuitry of a microprocessor.

4. A controller circuit for generating a train of signal pulses to control the movement of a stepper motor about at least one axis, comprising:
 means for storing an acceleration value, a maximum velocity value, and a distance value;
 microprocessor means running at a first predetermined rate for adding the acceleration value to itself cumulatively to produce a velocity value and for adding the velocity to itself cumulatively to produce a distance value; and
 multiplier means for interrupting the microprocessor means at the first predetermined rate to receive the distance value produced and for multiplying the distance value at a second, faster predetermined rate to produce the pulse train at the faster predetermined rate.

5. The controller circuit of claim 4 in which the multiplier means comprises a counter whose output is logically combined with the distance value to produce the pulse train.

* * * * *

UNITED STATES PATENT AND TRADEMARK OFFICE
CERTIFICATE OF CORRECTION

PATENT NO.   :  4,734,847
DATED        :  March 29, 1988
INVENTOR(S)  :  Terry B. Lyons It is certified that error appears in the above-identified patent and that said Letters Patent is hereby corrected as shown below:

Column 1, line 45, "stores" should be --stored--.
Column 5, line 11, "microcompressor" should be --microprocessor--.
Column 6, line 33, "S =" should be --s =--.
Column 6, line 48, "velocty" should be --velocity--.
Column 7, line 32, "This" should be --That--.

Columns 9-10, line 73, "C L X X L L H H H H H H H L H H L L hold back till not done" should be --C L X X X L L L H H H H H H L H H L L hold back till not done--.

Column 11, line 25, "+ /q2 * /q1 * q0 * /inhin" should be --+ q2 * q1 * q0 * /inhin--.

Column 12, third line from bottom, "accelaration" should be --acceleration--.

Column 14, line 44 (under "Procedure Home"), "decelerate to stop keeping track to position traveled" should be --decelerate to stop keeping track of position traveled--.
Column 16, before the first claim, insert: "I claim:".

Signed and Sealed this

Twenty-third Day of August, 1988

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,734,847
DATED : March 29, 1988
INVENTOR(S) : L. Wayne Hunter

It is certified that error appears in the above-identified patent and that said Letters Patent is hereby corrected as shown below:

Column 1, line 45, "stores" should be --stored--.
Column 5, line 11, "microcompressor" should be --microprocessor--.
Column 6, line 33, "S =" should be --s =--.
Column 6, line 48, "velocty" should be --velocity--.
Column 7, line 32, "This" should be --That--.

Columns 9-10, line 73, "C L X X X L L H H H H H H H L H H L L hold back till not done" should be --C L X X X L L L H H H H H H H L H H L L hold back till not done--.

Column 11, line 25, "+ /q2 * /q1 * q0 * /inhin" should be --+ q2 * q1 * q0 /inhin--.

Column 12, third line from bottom, "accelaration" should be --acceleration--.

Column 14, line 44 (under "Procedure Home"), "decelerate to stop keeping track to position traveled" should be --decelerate to stop keeping track of position traveled--.

Column 16, before the first claim, insert: "I claim:".

This certificate supersedes certificate of correction issued August 23, 1988.

Signed and Sealed this

Tenth Day of January, 1989

Attest:

DONALD J. QUIGG

Attesting Officer

Commissioner of Patents and Trademarks